May 7, 1940.                    W. J. HARSHAW ET AL                    2,199,794
                              OPACIFIER FOR VITREOUS ENAMELS
                           Filed Sept. 15, 1938          3 Sheets-Sheet 1

W. J. Harshaw and W. D. Stillwell INVENTOR.
BY William H Brown
ATTORNEY.

May 7, 1940.    W. J. HARSHAW ET AL    2,199,794
OPACIFIER FOR VITREOUS ENAMELS
Filed Sept. 15, 1938    3 Sheets-Sheet 2

W. J. Harshaw and W. D. Stillwell    INVENTOR.

BY William H Brown
ATTORNEY.

Patented May 7, 1940

2,199,794

UNITED STATES PATENT OFFICE 2,199,794

OPACIFIER FOR VITREOUS ENAMELS

William J. Harshaw, Shaker Heights, and William D. Stillwell, South Euclid, Ohio, assignors to The Harshaw Chemical Company, Elyria, Ohio, a corporation of Ohio Application September 15, 1938, Serial No. 230,104

15 Claims. (Cl. 106—36.2)

This invention relates to mill addition opacifiers for vitreous enamels.

Opacification of vitreous enamels is accomplished either by smelter additions in the production of an enamel frit or by mill additions to the quenched frit in the production of the enamel slip. Smelter addition opacifiers are often not suitable for mill addition opacification and vice versa.

In our prior United States patent, No. 2,033,707, we have described pre-calcined mill addition opacifiers capable of imparting to vitreous enamels a high degree of opacification. In enamels wherein we have used opacifiers according to our said patent, we have experienced, especially in the case of titanium containing compositions and to some extent also in zirconium containing compositions, a deficiency of reflectance in the violet. In the case of titanium compositions this deficiency appeared as a distinctly perceptible yellowish coloration in the enamel. Accordingly, it is highly desirable to overcome the indicated tendency to yellow coloration in the enamel by increasing its power of reflectance of violet light.

In accordance with the present invention it now becomes possible to overcome the undesirable tendency to yellow coloration and produce opacifiers similar to those of our said patent but productive of enamels exhibiting desirable high reflectance in the violet end of the visible spectrum.

Figure 1:
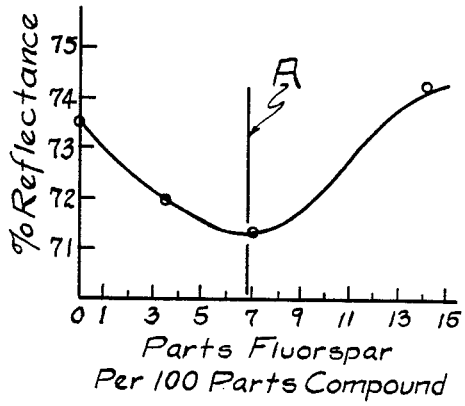
Figure 2:
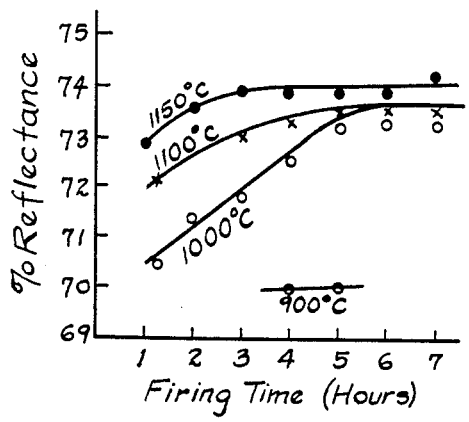
Figure 3:
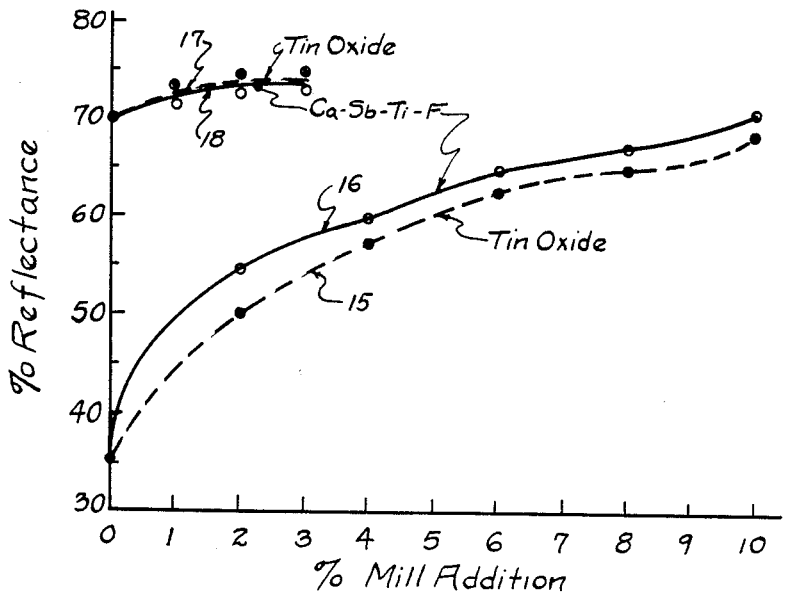

In the drawings, Fig. 1 is a graphic representation of the effect of calcining varying quantities of fluorine material with constant quantities of the other ingredients, in a mill addition opacifier according to the invention, on the opacity and color of a porcelain enamel opacified therewith; Fig. 2 is a graphic representation of the effect of time and temperature of calcination on mill additions, according to the invention, as measured by the opacity of the enamel opacified therewith; Fig. 3 is a graphic representation of the comparative effects of varying amounts of tin oxide and a typical mill addition according to the present invention, on two conventional enamel frits of diverse types as measured by the opacity of the resulting enamel; and, Figs. 4 to 9 inclusive are substantial copies of recording spectrophotometer charts showing the effect of various of the novel mill addition opacifiers on the reflectance of the resulting enamel over the range of the visible spectrum.

We have discovered that certain compositions, the calcination products of suitable quantities of oxides of antimony (either $Sb_2O_5$ or a lower oxide of antimony together with an oxidizing agent such as nitric acid capable of oxidizing such lower oxide to $Sb_2O_5$); oxide of titanium ($TiO_2$) or oxide of zirconium ($ZrO_2$), or suitable materials capable of yielding one or more of the same; a basic oxide (such as CaO, BaO, SrO, MgO, $Al_2O_3$, ZnO, or partial substitutions of alkali metal oxides therefor), or suitable materials capable of yielding the same; and a suitable fluorine containing material (such as $CaF_2$, suitably in the form of fluorspar, $BaF_2$, NaF, $MgF_2$, $Na_2ZrF_6$, $CaZrF_6$, $Na_3AlF_6$, and materials capable on calcination of producing same, such as $MgSiF_6$, $H_2SiF_6$ plus CaO, MgO plus HF, etc.), when used as mill addition opacifiers are capable of producing excellent opacification and with no tendency to yellow coloration of the enamel. If, however, the fluorine material is omitted, a distinct deficiency in reflectance of violet light can be demonstrated, which is slight in the zirconium compositions and more or less pronounced in the case of the titanium compositions.

We believe that complex reactions occur during the calcination but do not completely understand the nature of such reactions. Accordingly, the calcination products of the ingredients used in the production of the novel opacifier compositions are treated as "containing" certain constituent oxides and fluorine material, or as having a certain "composition" without thereby intending to limit the invention to any particular state of combination, solution or admixture of such oxides and fluorine material.

We have discovered that upon employment of increasing quantities of the fluorine containing materials, an increasing improvement is noted in the reflectance of violet light up to a point that the objectionable yellow coloration is no longer perceptible. This bleaching or whitening effect is accompanied by a decrease in opacity (total reflectance of white light) up to about the point where the yellow color is no longer perceptible. Surprisingly, however, still further additions of the fluorine containing materials, gradually increase the opacity of the resulting enamel to a value higher than when no fluorine material was present. Addition of the fluorine containing material as a smelter addition in the production of the frit does not produce the desired effect. The essential distinction between smelter additions and mill additions, is, as is well known, one of heating time, and, where the term "mill addition" or words of like import are used herein, it is intended to cover equivalent procedures where long heating of the opacifier with the frit is avoided. Calcination of the ingredients of the mill addition opacifiers of the present invention, other than the fluorine containing material, followed by incorporation of the separately calcined or uncalcined fluorine-containing material by grinding, produces a mill addition productive of enamels having the objectionable yellow coloration to the same extent as if no fluorine containing material had been added but with slightly lower opacity. Calcination of calcium antimonate with fluorspar or synthetic CaF₂, produces a mill addition productive of enamels of lower opacity than if opacified with calcium antimonate alone. Enamels opacified with calcium titanates are white or slightly creamy in color. The addition of fluorspar makes them distinctly yellow and without improving their already poor opacity. We are aware that fluorides are commonly used as smelter additions, but, as stated, they are not effective for our purpose when so used.

We are able to obtain an enamel of very excellent opacity, but deficient in reflectance of violet light, by using as a mill addition opacifier a calcination product of the following composition:

|  | Parts by weight |
|---|---|
| CaO | 20 |
| Sb₂O₅ | 46 |
| TiO₂ | 34 |

If to the batch of which the above composition is the calcination product is added 10 parts by weight of a suitable fluorine material, e. g., fluorspar, and the resulting calcination product is employed as a mill addition opacifier, an enamel is produced which is free from the objectionable yellow coloration.

The sample composition given above is typical but may be varied considerably without departing from the scope of the invention. We prefer to operate, and obtain best results by operating, within the following range of composition:

|  | Parts by weight |
|---|---|
| CaO | 18 to 22 |
| Sb₂O₅ | 44 to 46 |
| TiO₂ | 32 to 34 |
| CaF₂ | 5 to 30 |

In Fig. 1 we have shown the results (which are typical of tests using compositions in which the CaO, Sb₂O₅ and TiO₂ content was the same and the CaF₂ content was varied, as indicated. Approximately 17 parts CaO to 48 parts Sb₂O₅ to 35 parts TiO₂ were used, the CaF₂ content being varied from 3.5 to 14. The vertical line A indicates approximately the point at which the yellow coloration disappeared. At 5 per cent the coloration is very slight.

Our experiments indicate that the fluorine material should have a particle size of from 100 mesh to 200 mesh for best results although the degree of subdivision is not critical.

As above indicated, the oxides need not be employed as such but may be formed from other materials on calcination. Some sample batch compositions are as follows:

|  | Parts by weight |
|---|---|
| CaCO₃ (precipitated chalk) | 64.5 |
| Sb₂O₃ | 75.0 |
| TiO₂ | 62.0 |
| HNO₃ (conc.) | 32.0 |
| CaF₂ (fluorspar) | 38.0 |
| CaCO₃ (precipitated chalk) | 64.5 |
| Sb₂O₃ | 75.0 |
| TiO₂ | 62.0 |
| HNO₃ (conc.) | 32.0 |
| CaF₂ (fluorspar) | 44.0 |
| CaCO₃ | 64.5 |
| CaF₂ | 20.0 |
| Sb₂O₃ | 75.0 |
| TiO₂ | 62.0 |
| HNO₃ (conc.) | 32.0 |
| CaCO₃ | 40.6 |
| CaF₂ | 34.6 |
| Sb₂O₃ | 68.6 |
| TiO₂ | 56.6 |
| H₂O | 24.0 |
| Ca(NO₃)₂.H₂O | 33.4 |
| ZnO | 44.8 |
| TiO₂ | 66.2 |
| Sb₂O₃ | 80.0 |
| NaF | 40.0 |
| HNO₃ (conc.) | 28.0 |
| BaCO₃ | 394.0 |
| TiO₂ | 240.3 |
| Sb₂O₃ | 291.5 |
| CaF₂ | 105.0 |
| HNO₃ (conc.) | 150.0 |
| NaNO₃ | 42.5 |
| CaCO₃ | 150.0 |
| TiO₂ | 240.0 |
| Sb₂O₃ | 291.0 |
| NaF | 80.0 |
| HNO₃ (conc.) | 115.0 |
| CaCO₃ | 100.0 |
| MgCO₃ | 168.6 |
| TiO₂ | 240.3 |
| Sb₂O₃ | 291.5 |
| MgSiF₆ | 80.0 |
| HNO₃ (conc.) | 80.0 |
| MgCO₃ | 253.0 |
| TiO₂ | 240.0 |
| Sb₂O₃ | 291.5 |
| MgSiF₆ | 80.0 |
| HNO₃ (conc.) | 80.0 |
| CaCO₃ | 59.2 |
| Sb₂O₃ | 86.3 |
| ZrO₂ | 71.0 |
| Na₂ZrF₆ | 30.0 |
| HNO₃ (conc.) | 40.0 |

Calcination is carried out at a temperature preferably from 1000° C. to 1150° C., actual batch temperature, and preferably in an oxidizing kiln atmosphere. The time required varies according to the temperature and other conditions, especially the size of the batch, larger batches requiring longer time. As is clear from Fig. 2, the reflectance is nearly fully developed by three hours firing at 1150° C. whereas five or six hours are required at 1000° C. While other temperatures may be used successfully, as indicated in Fig. 2, we prefer five hours or longer at 1000° C. to 1100° C.

The above described mill-addition opacifying compositions are suitable for use in enamel frits generally for production of white enamels. In Fig. 3 we have compared our novel mill addition with tin oxide in a low reflectance enamel (curves 15 and 16), and in a super opaque enamel (curves 17 and 18), using the calcination product of the batch formula first above given. The samples corresponding to the lines 15 and 17 were opacified with tin oxide in the quantities shown, while the samples corresponding to the lines 16 and 18 were opacified with a calcium-antimony-titanium-fluorine composition according to the invention, as indicated.

The following examples will be illustrative of the effect of typical examples of our novel mill additions on the resulting enamels in respect to reflectance of violet light:

*Example I*

Composition of mill addition:
 CaO_____parts by weight__ 16.6
 $Sb_2O_5$_____do____ 47.7
 $TiO_2$_____do____ 35.5
Amount of mill addition agent
 added to enamel frit_____percent__ 6

Figure 4:
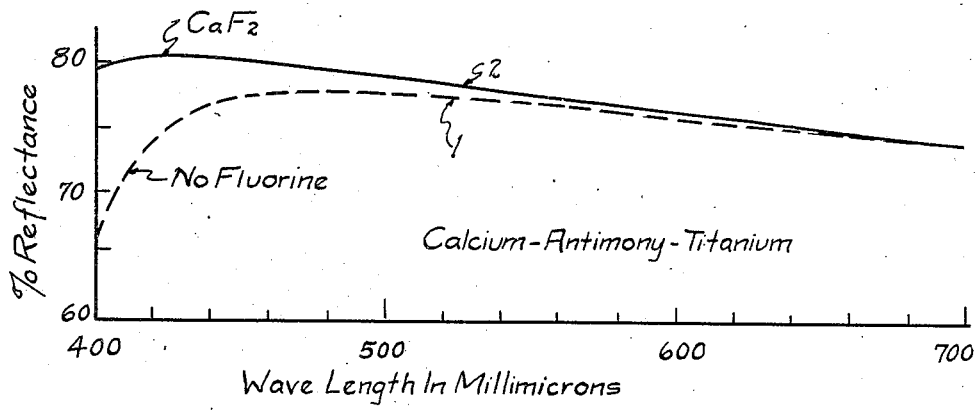

The reflectance of violet light in this case is shown clearly in Fig. 4, wherein reflectance in per cent ($MgCO_3$=100%) is plotted against wave length of light. This view is a substantial copy of a test sheet made on a recording spectrophotometer. In this view, the line 1 (broken) was produced by an enamel opacified with the above composition; the line 2 (full) was produced by an enamel opacified with a composition similar except being calcined with 10 parts by weight fluorspar.

*Example II*

Composition of mill addition:
 ZnO_____parts by weight__ 22.3
 $Sb_2O_5$_____do____ 44.5
 $TiO_2$_____do____ 33.1
Amount of mill addition agent
 added to enamel frit_____per cent__ 6

Figure 5:
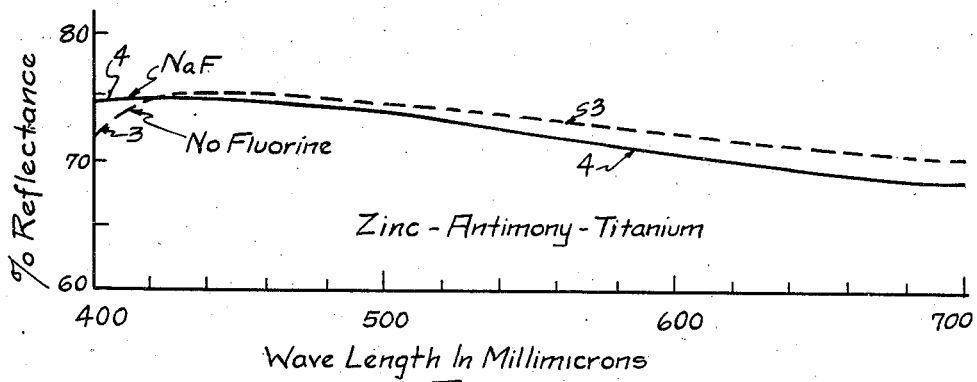

The reflectance of this example is shown in Fig. 5, the line 3 (broken) being a record of a test on an enamel containing the above opacifier. The line 4 (full) is a record of a test of an enamel opacified with a composition similar to that above except being calcined with 20 parts by weight of sodium fluoride.

*Example III*

Composition of mill addition:
 CaO_____parts by weight__ 7.8
 $Al_2O_3$_____do____ 14.2
 $Sb_2O_5$_____do____ 44.6
 $TiO_2$_____do____ 33.4
Amount of mill addition agent
 added to enamel frit_____per cent__ 6

Figure 6:
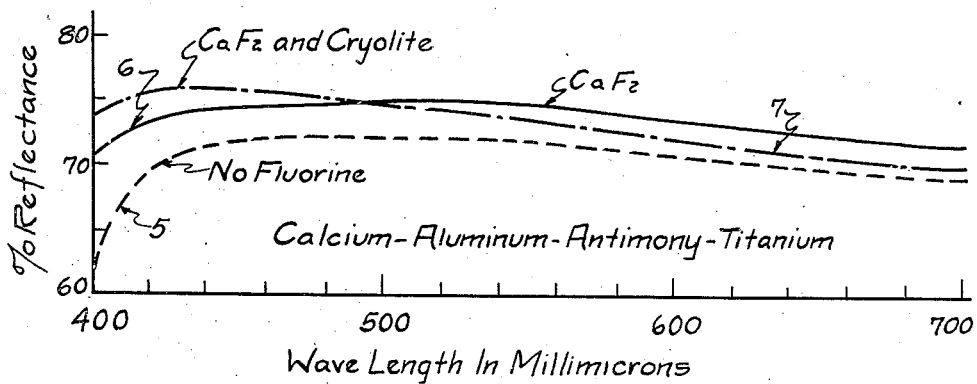

The reflectance of this sample is shown in Fig. 6, the line 5 (broken) being a record of a test on an enamel containing the above opacifier. The line 6 (full) shows the result of a test of an enamel opacified with a composition similar to the above except being calcined with 13% of fluorspar. The line 7 (dot and dash) shows the result of a test on an enamel opacified with a composition like that above except for the substitution of cryolite for a part (25%) of the fluorspar.

*Example IV*

Composition of mill addition:
 CaO_____parts by weight__ 14.0
 $Sb_2O_5$_____do____ 40.0
 $ZrO_2$_____do____ 46.0
Amount of mill addition agent
 added to enamel frit_____per cent__ 6

Figure 7:
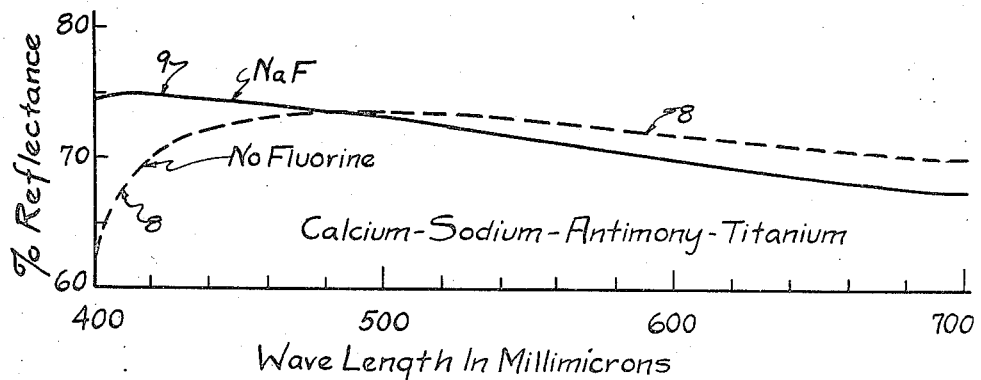

In Fig. 7 we have shown by the line 8 (broken) the reflectance of a porcelain enamel opacified with the above composition and in line 9 (full) the same but opacified with a composition varied in that with the above composition was calcined 11.3% of NaF.

*Example V*

Composition of mill addition:
 CaO_____parts by weight__ 14.0
 $Sb_2O_5$_____do____ 40.0
 $ZrO_2$_____do____ 46.0
Amount of mill addition agent
 added to enamel frit_____per cent__ 6

Figure 8:
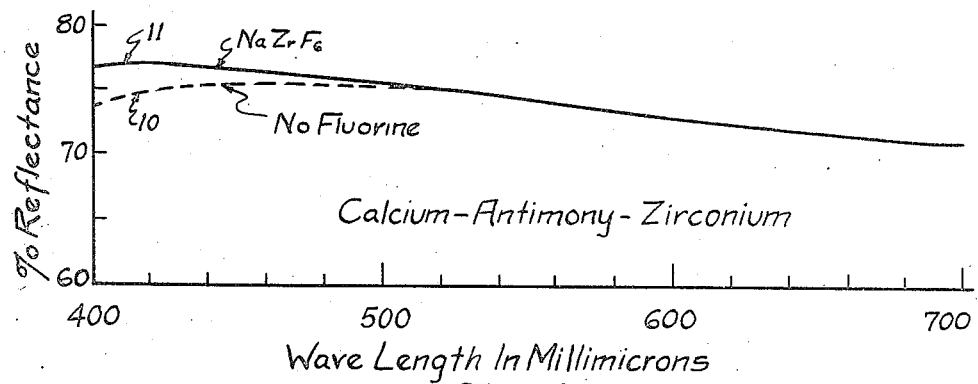

In Fig. 8 we have shown the results of reflectance tests in porcelain enamel of the above opacifier composition (line 10, broken) and a composition similar except for the calcination therewith of 20 parts by weight of $Na_2ZrF_6$ (line 11, full).

*Example VI*

Composition of mill addition:
 CaO_____parts by weight__ 23.0
 $Sb_2O_5$_____do____ 45.5
 $TiO_2$_____do____ 31.1
Amount of mill addition agent
 added to enamel frit_____per cent__ 6

Figure 9:
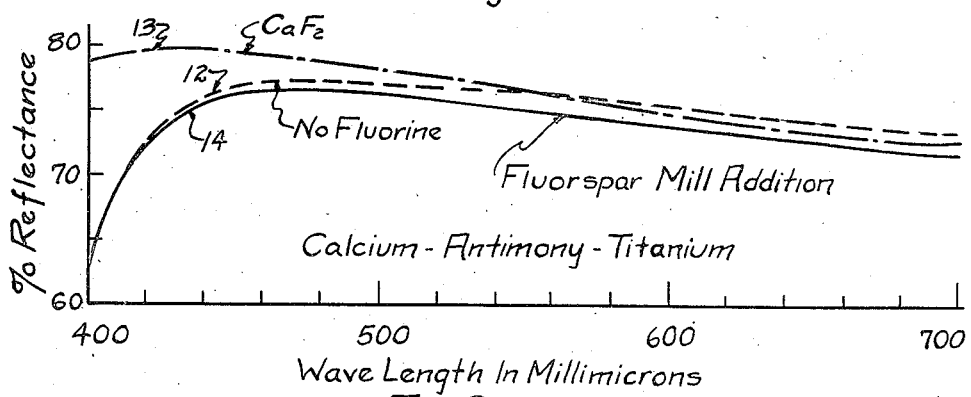

In Fig. 9 we have shown the results of opacification with the above composition (line 12, broken), with the same as varied by calcining therewith 20 parts by weight of fluorspar (line 13, dot and dash), and also as varied by grinding with the calcined composition 20 parts by weight of previously calcined fluorspar (line 14, full). It will be noted that when the fluorine material is calcined with the other constituents of the mill addition, the desired effect is produced.

This application is a continuation-in-part of our co-pending application Serial No. 178,760, filed December 8, 1937.

Having thus described our invention, what we claim is:

1. A mill addition opacifier for vitreous enamels, the same being a calcination product and containing: CaO, $Sb_2O_5$, $TiO_2$, and $CaF_2$.

2. A mill addition opacifier for vitreous enamels, the same being a calcination product and containing approximately:

Parts by weight
CaO_____ 13 to 22
$Sb_2O_5$ _____ 44 to 46
$TiO_2$ _____ 32 to 34
$CaF_2$ _____ 5 to 30

3. Process of making a vitreous enamel comprising the steps of firing together at from about 1000° C. to about 1150° C., in an oxidizing atmosphere, materials productive of the following:

Parts by weight
CaO_____ 18 to 22
$Sb_2O_5$ _____ 44 to 46
$TiO_2$ _____ 32 to 34
$CaF_2$ _____ 5 to 30 introducing the resulting calcination product into an enamel frit in quantity to develop substantial opacity, and grinding.

4. In making vitreous enamels, calcining together at temperatures between about 1000° C. and about 1150° C. for at least three hours, CaO, $Sb_2O_5$, $TiO_2$ and $CaF_2$, and introducing the calcination product into an enamel frit as a mill addition opacifier.

5. A mill addition opacifier for vitreous enamels, the same being a calcination product and containing approximately:

Parts by weight
CaO _____ 20
$Sb_2O_5$ _____ 46
$ZrO_2$ _____ 34
$Na_2ZrF_6$ _____ 14

6. A new mill addition opacifier for vitreous enamels, the same being a calcination product of calcium and antimony oxides together with titanium and zirconium oxides and a fluoride, and capable of opacifying a vitreous enamel without imparting thereto a yellowish color effect due to poor reflectance in the light wave length range 400 to 450 millimicrons.

7. A new mill addition opacifier for vitreous enamels, the same being a calcination product containing oxides of calcium, antimony, an element of the class consisting of titania and zirconia and a fluoride, and being free from the characteristic of producing yellow coloration in enamels opacified therewith to the extent that it is capable of imparting to a vitreous enamel a reflectance higher in the light wave length range 400 to 425 millimicrons than in the range 500 to 700 millimicrons, such enamel being one which if opacified with a mill addition not containing fluorine but otherwise identical in composition, manufacture and use, would exhibit an average reflectance more than five per cent lower in the violet range from 400 to 425 millimicrons than in the range 500 to 700 millimicrons.

8. A new mill addition opacifier for vitreous enamels, the same being a calcination product containing oxides of calcium, antimony, an element of the class consisting of titania and zirconia, and a flouride, and being free from the characteristic of producing yellow coloration in enamels opacified therewith to the extent that it is capable of imparting to a vitreous enamel a reflectance higher in the light wave length range 400 to 425 millimicrons than in the range 500 to 700 millimicrons, calcium oxide being present to the extent of at least approximately 14% of the combined weight of said oxides, titania or zirconia being present to a substantially greater extent than calcium oxide, antimony oxide being present to a substantially greater extent than any other oxide and fluoride being present to the extent of from 5 to 30% of the combined weights of the said oxides.

9. A new opacifier for vitreous enamels, the same being a calcination product containing oxides of calcium, antimony and titanium and also containing a fluoride, calcium oxide being present to the extent of at least approximately 14% of the combined weight of said oxides, titania being present in greater proportion than calcium oxide and antimony being present in greater proportion than titania, the fluoride being present in proportion from 5% to 30% of the combined weight of said oxides.

10. A new opacifier for vitreous enamels, the same being a calcination product containing essentially oxides of calcium, antimony and, one or more oxides of the class consisting of titania and zirconia together with a fluoride, calcium oxide being present to the extent of at least approximately 14% of the weight of said oxides, the oxide or oxides of the class consisting of titania and zirconia being present in quantity greater than calcium oxide and antimony oxide being present in still greater quantity and the fluoride being present in quantity from 5% to 30% of the combined weight of said oxides.

11. A mill addition opacifier for vitreous enamels, the same being the product of calcination of oxy-compounds of calcium, antimony and titanium, capable of yielding on calcination approximately:

| | Parts by weight |
|---|---|
| CaO | 18 to 22 |
| $Sb_2O_3$ | 44 to 46 |
| $TiO_2$ | 32 to 34 | together with a fluoride in proportion from 5% to 30% of the said oxides.

12. A mill addition opacifier for vitreous enamels, the same being the product of calcination of oxy-compounds of calcium, antimony and titanium, capable of yielding on calcination approximately:

| | Parts by weight |
|---|---|
| CaO | 18 to 22 |
| $Sb_2O_3$ | 44 to 46 |
| $TiO_2$ | 32 to 34 | together with calcium fluoride in proportion from 5% to 30% of the said oxides.

13. A mill addition opacifier for vitreous enamels, the same being a calcination product and containing CaO, $CaF_2$, $Sb_2O_5$ and $TiO_2$ in approximately the proportions:

| | Parts by weight |
|---|---|
| Calcium compounds | 23 to 52 |
| Antimony oxide | 44 to 46 |
| Titania | 32 to 34 | calcium fluoride being present to the extent of at least five parts by weight.

14. An opacifier for vitreous enamels, the same being the product of calcining materials capable of yielding upon calcination approximately:

| | Parts by weight |
|---|---|
| CaO | 17 to 22 |
| $Sb_2O_5$ | 44 to 48 |
| $TiO_2$ | 32 to 35 |
| $CaF_2$ | 3.5 to 30 |

15. Process of making a vitreous enamel comprising the steps of firing together at from about 1000° C. to about 1150° C., in an oxidizing atmosphere, materials productive of the following:

| | Parts by weight |
|---|---|
| CaO | 17 to 22 |
| $Sb_2O_5$ | 44 to 48 |
| $TiO_2$ | 32 to 35 |
| $CaF_2$ | 3.5 to 30 | introducing the resulting calcination product into an enamel frit in quantity to develop substantial opacity, and grinding.

WILLIAM J. HARSHAW.
WILLIAM D. STILLWELL.